United States Patent [19]

Rizzo

[11] 4,275,276

[45] Jun. 23, 1981

[54] AUTOMATICALLY ADJUSTABLE BIDIRECTIONAL-TO-UNIDIRECTIONAL TRANSMISSION NETWORK

[75] Inventor: Joseph F. Rizzo, Lodi, N.J.

[73] Assignee: Bell Telephone Laboratories, Incorporated, Murray Hill, N.J.

[21] Appl. No.: 64,042

[22] Filed: Aug. 6, 1979

[51] Int. Cl.³ ............................................... H04B 1/58
[52] U.S. Cl. ................................................ 179/170 D
[58] Field of Search ........ 179/170 R, 170 D, 170 NC

[56] References Cited

U.S. PATENT DOCUMENTS

| | | | |
|---|---|---|---|
| 3,982,080 | 9/1976 | Ukeiley | 179/170 D |
| 4,096,361 | 6/1978 | Crawford | 179/170 D |
| 4,096,362 | 6/1978 | Crawford | 179/170 D |

Primary Examiner—Bernard Konick
Assistant Examiner—Randall P. Myers
Attorney, Agent, or Firm—Thomas Stafford

[57] ABSTRACT

Transhybrid loss is maximized in a transmission network (FIG. 1, 101) of the type for coupling a bidirectional transmission facility (102, 2-wire) to receive (103) and transmit (104) unidirectional transmission facilities (4-wire) by automatically adjusting impedance elements (RKL and RZL) of an impedance network (202, FIG. 3) to obtain an optimum match to the impedance of the bidirectional facility (102). To this end, a plurality of tones (107) are individually supplied to a receive port (111) of the transmission network (101) and the impedance elements (RKL and RZL) are controllably adjusted in a prescribed sequence (FIGS. 7–10) to obtain amplitude nulls at a transmit port (112) of the transmission network (101). Then, an additional signal having a plurality of predetermined frequency components which repeat periodically is supplied to the receive port (111) and a predetermined one of the impedance elements (RKL) is again adjusted to obtain an average value amplitude null at the transmit port (112). In one embodiment of the invention, the additional signal is a pseudo-random noise signal having frequency components at a fixed spacing in a predetermined frequency band.

11 Claims, 10 Drawing Figures

AUTOMATICALLY ADJUSTABLE BIDIRECTIONAL-TO-UNIDIRECTIONAL TRANSMISSION NETWORK

CROSS-REFERENCE TO RELATED APPLICATIONS

U.S. patent application entitled "Automatically Adjustable Bidirectional-to- Unidirectional Transmission Network", Ser. No. 64,041 is being filed in the U.S. Patent and Trademark Office concurrently herewith.

TECHNICAL FIELD

This invention relates to transmission networks and, more particularly, to circuit arrangements for automatically adjusting bidirectional-to-unidirectional transmission networks to maximize signal loss between a receive unidirectional facility and a transmit unidirectional facility in a 4-wire transmission system.

BACKGROUND OF THE INVENTION

A number of arrangements are known in the art for coupling signals from a bidirectional transmission facility to receive and transmit unidirectional transmission facilities. One example of this type transmission network is employed to couple a two-wire bidirectional telephone transmission facility to a four-wire telephone transmission facility. These arrangements are commonly referred to as hybrid circuits, whether they employ a hybrid transformer or not.

As is now known, it is desirable to adjust a complex impedance circuit in the transmission coupling network in order to obtain a better match to the impedance of the bidirectional transmission facility thereby maximizing loss between the receive and transmit unidirectional facilities. This is commonly referred to as maximizing transhybrid loss.

Many transmission networks employ so-called hybrid networks to realize the desired two-to-four wire coupling. Transmission networks employing either hybrid transformers or electronic circuits are now commonly employed in telephone transmission systems to realize the desired two-to-four wire coupling. In using either a hybrid transformer or an electronic "hybrid" it is desirable to employ a network having an impedance which substantially matches the impedance of the bidirectional transmission facility. Otherwise, low transhybrid loss results which, in turn, yields unwanted signal reflections. That is to say, a portion of the signal on the receive unidirectional facility appears in the transmit unidirectional facility. To this end, in transformer type hybrids, a complex impedance network is employed in an attempt at matching the impedance of the two-wire facility. Similarly, in electronic canceller type hybrids, a network having a complex transfer (impedance) characteristic is employed to generate an error signal in attempting to cancel unwanted signals in the transmit unidirectional facility.

In either arrangement adjustable impedance networks have been used in order to obtain a better impedance match to the bidirectional facility and, hence, to maximize transhybrid loss.

In transmission networks which employ hybrid transformers it has become the practice to employ an electronic network to generate a driving point impedance which emulates the complex impedance of the bidirectional transmission facility and, thereby, balance the hybrid transformer.

In a copending application of J. F. Rizzo and R. A. Rudisill, Ser. No. 06/064,041, filed Aug. 6, 1979, an arrangement is disclosed for automatically adjusting impedance elements of an adjustable impedance network in an attempt at obtaining an optimum match to a particular bidirectional transmission facility. The arrangement employs individual tones which are supplied to a receive port of a transmission network while corresponding individual impedance elements are adjusted until an amplitude null is detected at a transmit port of the transmission network. The tone signals are supplied and the amplitude adjustments are made in a prescribed sequence in order to obtain the best match to the impedance of the bidirectional facility. The disclosed procedure rapidly yields an optimum match for a nonloaded bidirectional facility. However, since the adjustable impedance network for a loaded bidirectional facility generates an impedance which approximates that of the loaded facility, it is possible that the individual tone signals may be at frequencies at which impedance peaks or valleys may occur when attempting to match the loaded bidirectional facility. Consequently, this results in less than an optimum match to the impedance of the loaded facility.

Thus, although the prior known balance arrangements are satisfactory for some applications they are undesirable for others.

SUMMARY OF THE INVENTION

Transhybrid loss is maximized in a transmission network for coupling receive and transmit unidirectional facilities to a loaded bidirectional facility, in accordance with one aspect of the invention, by controllably adjusting impedance elements of an adjustable impedance circuit in the transmission network in a prescribed sequence to obtain signal amplitude nulls at the transmit port of the network when supplying at least an individual tone signal having a predetermined frequency and a test signal having a plurality of predetermined frequency components to the receive port of the network.

In accordance with another aspect of the invention, the impedance elements are adjusted in a prescribed sequence while supplying individual ones of a plurality of distinct tone signals each having a predetermined signal frequency to the receive port until an amplitude null is detected at the transmit port. Then, a predetermined one of the impedance elements is again adjusted while supplying a test signal having a plurality of predetermined frequency components to the receive port until an average value amplitude null is detected at the transmit port.

In one embodiment of the invention, the periodic frequency characteristics of a pseudo-random noise signal are turned to account further to assure against possibly adjusting the impedance network to an impedance peak or an impedance valley, thereby resulting in a more optimum match to the impedance of a particular loaded bidirectional facility.

In one embodiment of the invention, a control logic circuit is employed to generate signals for adjusting impedance elements in an adjustable impedance network to obtain the desired null indications and, hence, to obtain the desired maximization of a transhybrid loss. The control logic circuit also controls a signal source to supply individual ones of at least a plurality of tone signals, each having a predetermined frequency and the pseudo-random noise signal to the receive port of the bidirectional-to-unidirectional transmission network in a prescribed sequence. A detection circuit under control of the control logic circuit samples the signal amplitude at the transmit port. The control logic circuit generates signals for adjusting predetermined ones of the impedance elements of the adjustable impedance circuit in a prescribed sequence to obtain an amplitude null indication at the transmit port while supplying corresponding ones of the tone signals and the pseudo-random noise signal to the receive port. In one example, the adjustment sequence includes adjusting a first impedance element at a first tone frequency until an amplitude null is obtained, adjusting a second impedance element at a second tone frequency until an amplitude null is obtained, and again adjusting the first impedance element while the pseudo-random noise signal is being supplied until an average value amplitude null is obtained. The values of the impedance elements are then fixed until another adjustment cycle is initiated.

BRIEF DESCRIPTION OF THE DRAWING

The invention will be more fully understood from the following detailed description of an illustrative embodiment thereof taken in connection with the appended figures in which.

DETAILED DESCRIPTION

Figure 1:
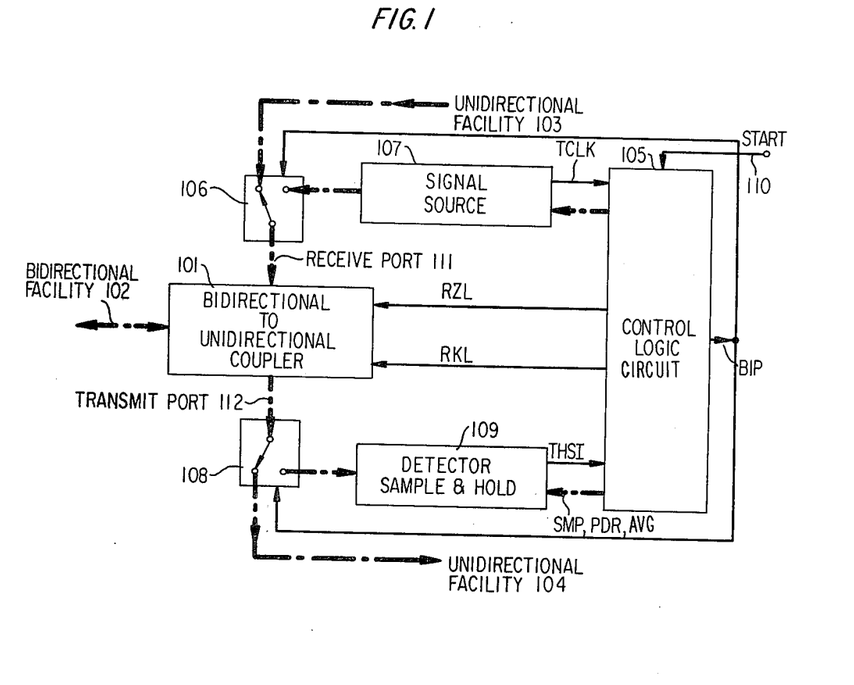
FIG. 1 shows in simplified block diagram form an arrangement for coupling a bidirectional transmission facility to unidirectional receive and transmit transmission facilities including an automatically adjustable impedance network in accordance with aspects of the invention.

FIG. 1 shows in simplified block diagram form an automatically adjustable bidirectional-to-unidirectional transmission coupling network, for example, a two-wire to four-wire telephone coupling network employing the instant invention. Accordingly, shown is bidirectional-to-unidirectional coupler 101 for coupling bidirectional transmission facility 102 to receive unidirectional transmission facility 103 and transmit unidirectional transmission facility 104. Each transmission facility is, for example, a two-wire telephone line. Thus, coupler 101 is, for example, a two-wire to four-wire coupler. Control logic circuit 105 is employed to generate signals for adjusting impedance elements in coupler 101, for example, control signals RZL and RKL, to minimize signals being received on receive facility 103 from being transmitted on transmit facility 104. That is to say, the impedance of coupler 101 is automatically adjusted to obtain an optimum match to the impedance of bidirectional facility 102, thereby maximizing transhybrid loss. To this end, control logic circuit 105 also generates signals for connecting receive port 111 via switching element 106 to signal source 107 and for connecting transmit port 112 via switching element 108 to peak detector, sample and hold circuit 109. During a normal transmission mode of operation coupler 101 is connected to receive and transmit transmission facilities 103 and 104 via receive port 111 and transmit port 112, and switching elements 106 and 108, respectively. An impedance adjustment cycle is initiated in response to a start signal supplied via input 110. The start signal may be initiated, for example, manually by a craftsperson or electronically in response to a telephone off-hook indication.

Switching elements 106 and 108 may be any of numerous ones known in the art. Preferably, the switching is achieved electronically via use of summing amplifiers or the like including the capability to switch the inputs thereto as desired.

Signal source 107 generates a plurality of distinct output tones and a pseudo-random noise signal which are supplied under control of control logic circuit 105 on an individual basis via switching element 106 to receive port 111. To this end, signal source 107 comprises elements (not shown) including an oscillator, counter and plurality of low-pass filters for generating a plurality of tone signals and a pseudo-random noise generator. In this example, at least two tone signals are generated each having a predetermined frequency, for example, 1300 Hz and 325 Hz, while the pseudo-random noise signal has frequency components spaced approximately 100 Hz apart in a band from 700 Hz to 3400 Hz. Other frequency spacings may equally be employed in the pseudo-random noise signals. It is the repetitive nature of the pseudo-random noise signal which assures against obtaining an impedance adjustment at a specific impedance peak or valley of adjustable impedance network 202. Additionally, the repetitive nature of the pseudo-random noise signal allows for a rapid adjustment, since unlike random noise, its frequency components are repeated at a fixed interval, in this example, approximately every 10 milliseconds. This assures that an indication of an average value amplitude null is truly one, as distinguished from a variation in the noise signal itself as would occur if a random noise signal were used. The pseudo-random noise signal is generated in well-known fashion by employing an oscillator in conjunction with a shift register and exclusive NOR gate (not shown). Inputs to the filters are controlled by signals from control logic circuit 105 which, in turn, control the supplying of the individual tones to receive port 111. Signal source 107 also generates signal TCLK (FIG. 6) which is a pulse signal having a frequency equal to the tone signal frequency being supplied from source 107 to facility 103. For the pseudo-random noise signal TCLK is a pulse signal generated at the beginning of each noise signal cycle. TCLK is employed in control logic circuit 105 as discussed below.

Bidirectional-to-unidirectional coupler 101 may be any one of a number of couplers known in the art and capable of being adjusted for obtaining an optimum match to the impedance of bidirectional facility 102 thereby maximizing signal loss from receive facility 103 to transmit facility 104. An example of an adjustable electronic hybrid is disclosed in U.S. Pat. No. 4,074,087 noted above.

Figure 2:
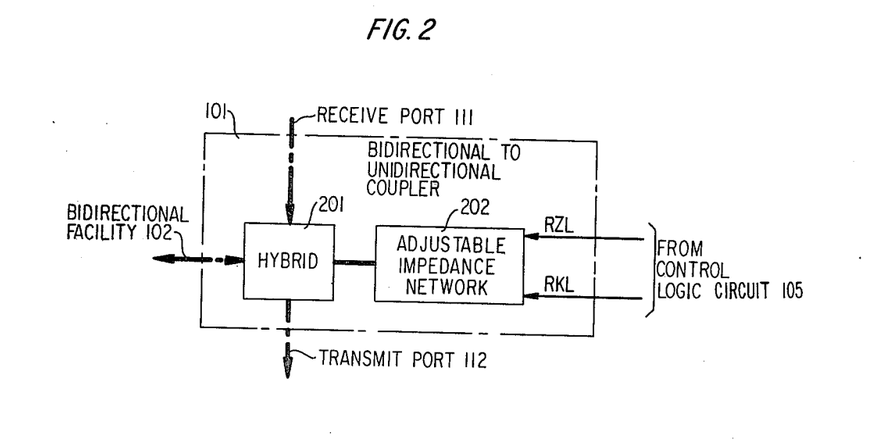
FIG. 2 depicts in simplified form details of the bidirectional-to-unidirectional coupler of FIG. 1.

FIG. 2 shows in simplified form details of one arrangement which may be employed in bidirectional-to-unidirectional coupler 101 which includes hybrid transformer 201 and adjustable impedance network 202. Network 202, in this example, is responsive to control signals, for example, RZL and RKL from control logic circuit 105 to obtain an impedance which is an optimum match to the impedance of a particular bidirectional transmission facility 102.

Figure 3:
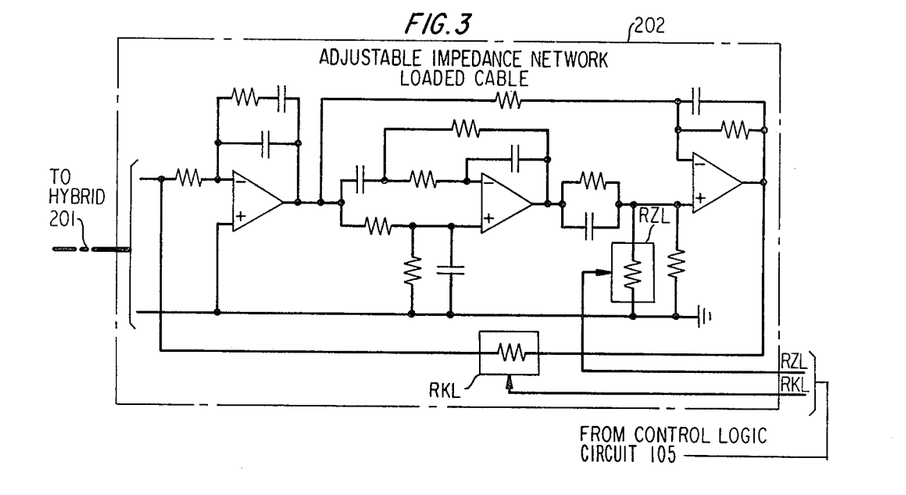
FIG. 3 illustrates an adjustable impedance network intended for use in the bidirectional-to-unidirectional coupler of FIG. 2 when matching loaded telephone cable.

FIG. 3 shows in simplified form details of an adjustable impedance network which may be advantageously employed for network 202 of FIG. 2. This adjustable impedance network is intended for use in matching the impedance of a loaded (L) bidirectional two-wire telephone transmission facility 102. It is noted, however, that this balance network only has a variable scalar multiplier controlled by resistor RKL and a variable real zero controlled by resistor RZL. This network is essentially identical to a network shown in FIG. 6 of U.S. Pat. No. 3,919,502 noted above and described therein. The only differences between the network shown in the noted patent and the network shown in FIG. 3 herein being that resistors RKL and RZL are controllable variable impedance elements and are adjustable in response to control signals RKL and RZL, respectively, generated by control logic circuit 105. Consequently, when using the adjustable impedance network shown in FIG. 4 herein, control logic circuit 105 generates only control signals RKL and RZL.

The driving point impedance generated by this network only approximates the impedance of a loaded telephone cable. To this end, the impedance versus frequency characteristic has impedance peaks and valleys. The average of the peaks and valleys being a smooth line approximating the loaded cable impedance versus frequency. Consequently, if one or more of the tone frequencies falls at an impedance peak or valley when attempting to match a specific loaded facility, less than an optimum match is obtained. This is avoided, in accordance with an aspect of this invention, by using the pseudo-random noise signal to optimize the impedance adjustment of network 202.

Figure 4:
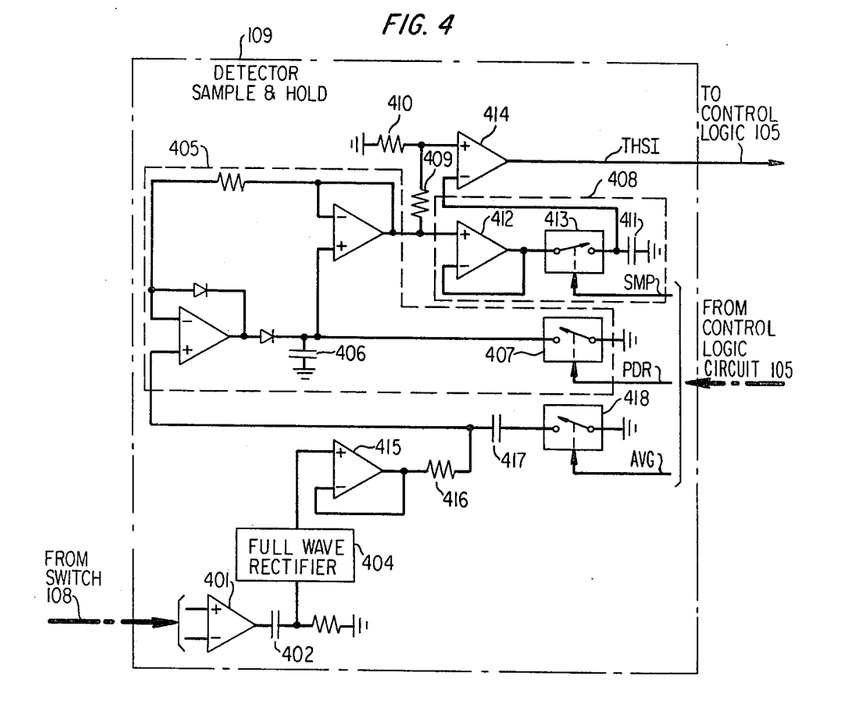
FIG. 4 shows in simplified form details of the detector, sample and hold circuit used in FIG. 1.

FIG. 4 shows in simplified form details of detector, sample and hold circuit 109. A balanced input from transmission facility 104 (FIG. 1) is supplied via switching element 108 to buffer amplifier 401. Although shown as a part of circuit 109 amplifier 401 may be included as part of transmission facility 104 or as part of switching element 108. An output from amplifier 401 is supplied via coupling capacitor 402 to full wave rectifier 404. In turn, the full wave rectified output from rectifier 404 is supplied via buffer amplifier 415 to resistor 416 and averaging (AVG) circuit capacitor 417. Averaging capacitor 417 is controllably connected in circuit via switching element 418. Element 418 is controlled by signal AVG from control logic circuit 105. Peak holding capacitor 406 is shunted by controllable switching element 407 which is controlled to reset detector 405 via control signal PDR from control logic 105 (FIG. 1). An output from peak detector 405 is supplied to sample and hold circuit 408 and to a voltage divider including resistors 409 and 410. When AVG capacitor 417 is connected in circuit the output from peak detector 405 is approximately the average value of the signal supplied via switch 108. The output from peak detector 405 is controllably supplied to holding capacitor 411 via buffer amplifier 412 and controllable switching element 413. Switching element 413 is controlled by control signal SMP from control logic circuit 105. A signal developed at the junction of resistors 409 and 410 is supplied to a first input of comparator 414 while a signal developed across capacitor 411 is supplied to a second input of comparator 414. Resistors 409 and 410 form a voltage divider in which the resistance value of resistor 410 is approximately 40 times the resistance value of resistor 409. This establishes a prescribed detection threshold for determining whether the output of peak detector 405 is greater than the output from sample and hold 408. Comparator 414 yields an indication of whether the presently detected average or peak value from peak detector 405 is larger or smaller than the last sampled value stored on capacitor 411. An output from comparator 414 designated THSI is supplied to control logic circuit 105. The signal developed at output THSI is limited either to a positive potential representative of a logical "1" or to substantially zero potential representative of a logical "0". The logical "1" THSI output indicates that the presently detected peak value from peak detector 405 is greater than the last sampled peak value stored on capacitor 411. Conversely, the logical "0" output indicates that the presently detected peak value from detector 405 is less than the last sampled peak value stored on capacitor 411. Control signal PDR controls resetting of peak detector 405 to an initial condition while control signal SMP controls sampling of the output from detector 405.

Figure 5:
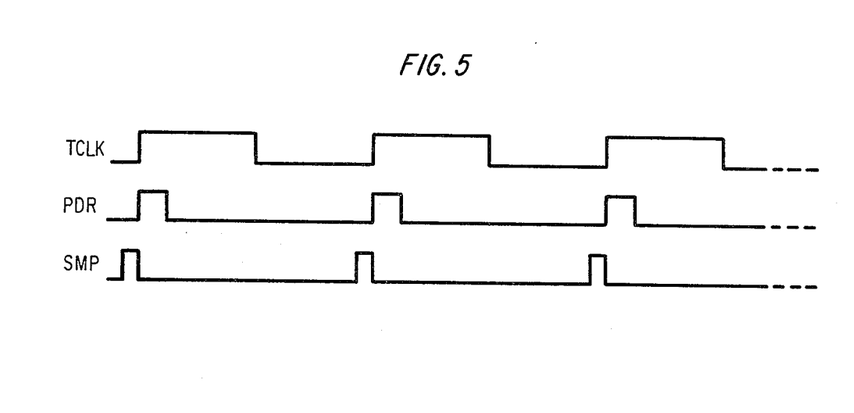
FIG. 5 depicts a sequence of waveforms useful in describing the operation of the detector, sample and hold circuit of FIG. 5.

FIG. 5 is a timing diagram illustrating the peak detecting, sampling and interrogating process. Signals PDR and SMP are generated in prescribed relationship to signal TCLK from source 107 (FIG. 1). Similarly, output THSI from comparator 414 (FIG. 4) is interrogated by control logic circuit 105 just before the output from detector 405 is again sampled. That is, THSI is sampled just prior to generation of SMP. Signal TCLK is a pulse signal having the same frequency as the individual tone signal being generated by source 107. When the pseudo-random noise signal is being generated, TCLK is a pulse signal of approximately 100 microseconds duration occurring at the beginning of each 10 millisecond pseudo-random noise signal cycle.

Figure 6:
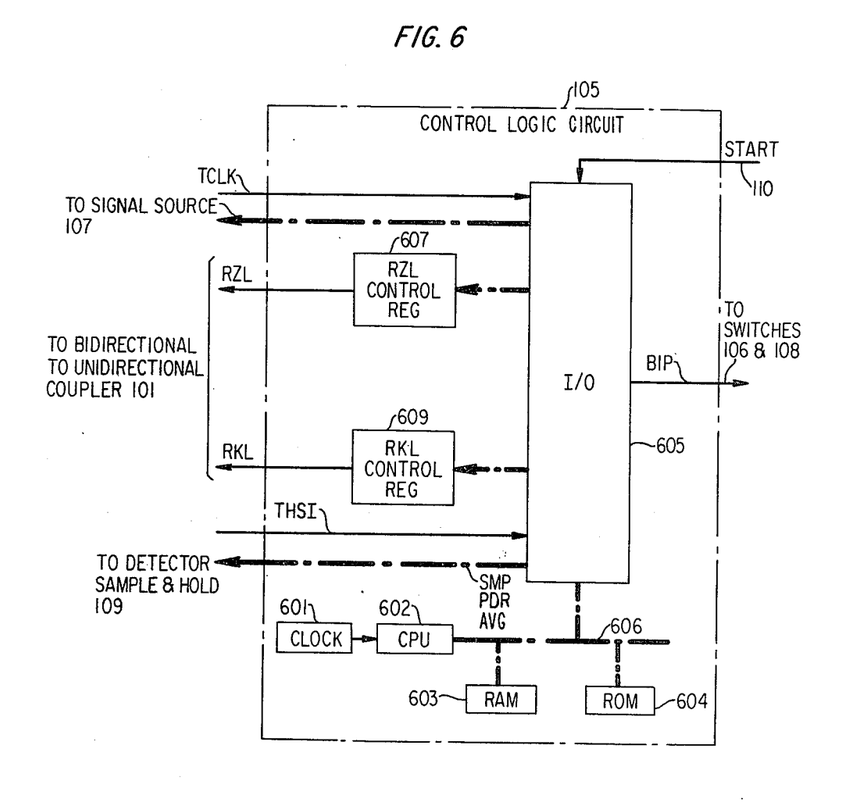
FIG. 6 shows in simplified block diagram form details of the control logic circuit employed in FIG. 1.

FIG. 6 shows in simplified block diagram form details of one arrangement which may be advantageously employed as control logic circuit 105. Although control logic circuit 105 may be implemented using any of several arrangements known in the art, a microcomputer is preferable. Accordingly, shown are clock circuit 601, central processor unit (CPU) 602, read-write memory unit, commonly referred to as random access memory (RAM) 603, read-only memory (ROM) 604, and input-/output unit (I/O) 605, all inter-connected via bus 606 to form a microcomputer system. Clock 601 generates timing signals for CPU 602. Also included in control logic circuit 105 are a plurality of control registers, namely, RZL control register 607 and RKL control register 609. Control registers 607, and 609 are employed to generate control signals RZL and RKL which, in turn, are supplied to bidirectional-to-unidirectional coupler 101. In an example from experimental practice, an Intel 8748 microcomputer system has been employed in conjunction with control registers 607 and 609 to form control logic circuit 105. Operation and programming of the Intel 8748 system is described in "Intel MSC-48 Family of Single Chip Microcomputers—Users Manual", dated 1978.

CPU 602 includes a plurality of working registers which are employed in the process of generating control signals for adjusting the impedance values of the particular adjustable impedance network 202 (FIG. 2). Programs for effecting the desired impedance adjustments are stored in ROM 604.

Operation of control logic circuit 105 in generating control signals for adjusting an adjustable impedance network 202, in accordance with one aspect of the invention, is described below in conjunction with digital program flow charts shown in FIGS. 7 through 10. The programs described in the flow charts may be reduced to a program listing in assembly language for the Intel 8748 microcomputer system to describe a set of electrical control signals that serve to configure control logic circuit 105 into a machine capable of generating control signals for adjusting impedances in a loaded adjustable impedance network. The adjustable network as shown in FIG. 3 is thereby controlled to obtain an optimum match to a particular loaded bidirectional facility 102. See for example, the program listing for generating a set of control signals for adjusting a nonloaded adjustable impedance network in the appendix of my copending application cited above. It will be apparent to those skilled in the art how to generate a similar listing for the instant loaded facility adjustment procedure.

Figure 7:
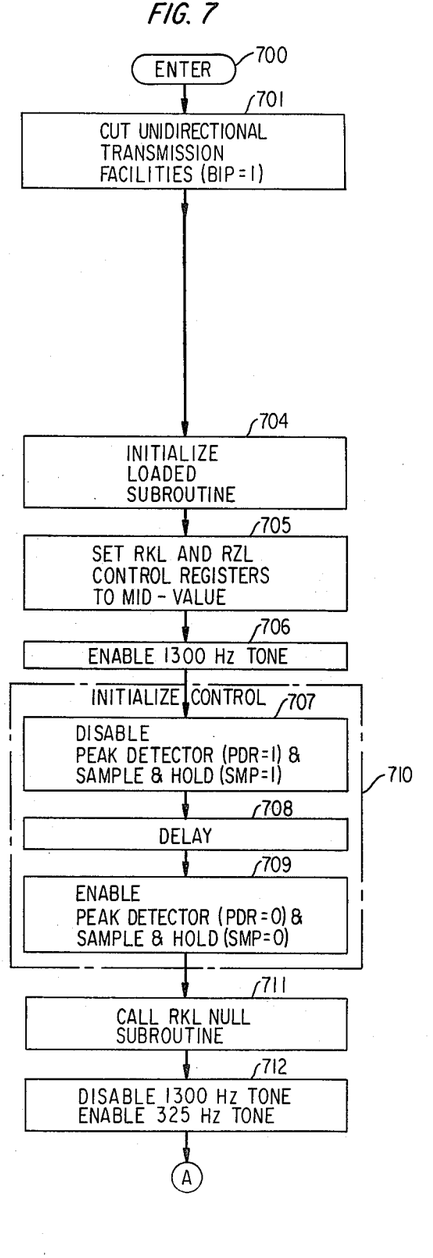
FIGS. 7 and 8 when connected A—A form a flow chart of a main program routine illustrating a sequence of steps employed in one embodiment of the invention for adjusting the impedance of the bidirectional-to-unidirectional coupler of FIG. 1 to effect an optimum impedance match for a loaded bidirectional transmission facility.
Figure 8:
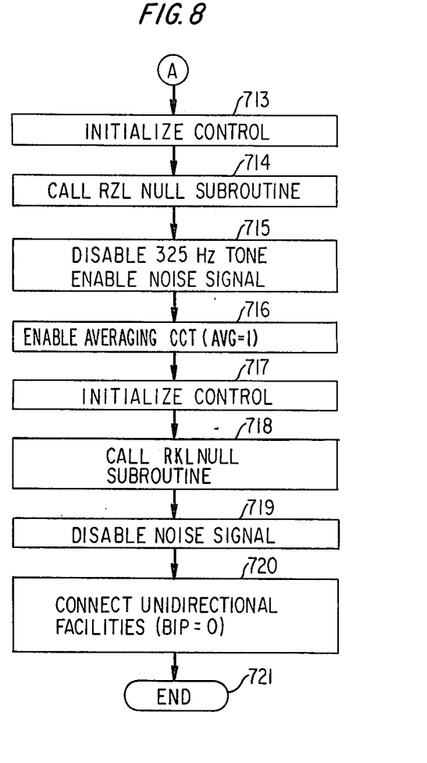

FIGS. 7 and 8 when connected A—A form a flow chart of a main program routine for generating in control logic circuit 105 control signals for automatically adjusting loaded adjustable impedance network 202 (FIG. 3). The flow chart can be seen to include three different symbols, the oval symbols indicate the beginning and end of the routine, the rectangle symbols commonly referred to as operational blocks contain the description of a particular detailed operational step, and the diamond symbols commonly referred to as control branch points contain a description of a test performed by the microcomputer for enabling it to determine the next operation to be performed.

As shown in the flow chart of FIGS. 7 and 8, the impedance network adjustment routine is entered at oval 700. Operational block 701 indicates that both receive unidirectional facility 103 (FIG. 1) and transmit unidirectional facility 104 are disconnected via switching elements 106 and 108, respectively, from bidirectional-to-unidirectional coupler 101 in response to a logical "1" BIP signal, i.e., BIP=1 from control logic circuit 105. Additionally, receive port 111 of coupler 101 is connected via switching element 106 to signal source 107 and transmit port 112 of coupler 101 is connected via switching element 108 to detector, sample and hold 109. Simply stated, the automatically adjustable impedance control network is connected to bidirectional-to-unidirectional coupler 101. Control is thereafter transferred to operational block 704.

A loaded adjustment program routine is employed because facility 102 is a loaded (L) telephone facility.

Operational block 704 causes the loaded facility program routine to be initialized, i.e., clearing registers and the like.

Operational block 705 causes RKL control register 709 and RZL control register 707 (FIG. 7) to be set to their respective midvalues.

Operational block 706 causes signal source 107 (FIG. 1) to be enabled for generating a first predetermined tone signal, in this example 1300 Hz.

Operational block 707 causes detector, sample and hold 109 (FIG. 1) to be disabled by supplying logical 1 PDR and SMP signals thereto, i.e., PDR=1, SMP=1. Averaging circuit capacitor 417 (FIG. 4) is disconnected via AVG=0.

Operational block 708 interposes a predetermined delay interval to insure that transients resulting from enabling generation of the tone signal diminishes. In this example, the delay is equal to eight positive transitions of signal TCLK from signal source 107 or approximately 5 milliseconds.

Operational block 709 causes detector, sample and hold 109 to be enabled by supplying logical 0 PDR and SMP signals thereto, i.e., PDR=0, SMP=0. Averaging circuit capacitor 417 remains disabled via AVG=0.

Operational blocks 707, 708 and 709 in effect initialize the control circuitry prior to calling amplitude null search subroutines and are designated initialize control 710.

Figure 9:
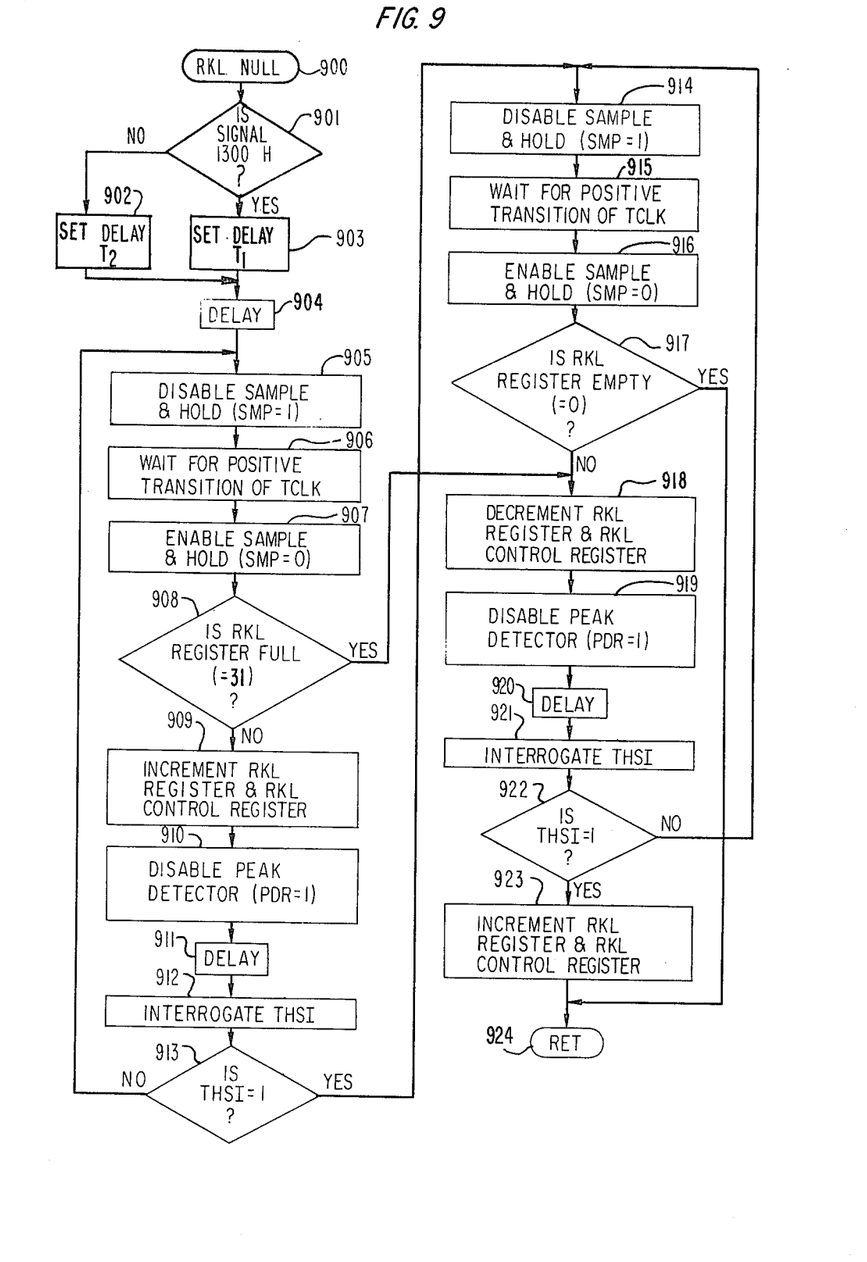
FIG. 9 is a flow chart of the RKL amplitude null search subroutine employed in the flow chart of FIGS. 7 and 8.

Operational block 711 causes adjustable impedance RKL null subroutine to be called. A flow chart of the RKL null subroutine is shown in FIG. 9 and is described below. The RKL null subroutine controls generation of signals to effect a first impedance adjustment in a prescribed sequence, in accordance with an aspect of the invention, to generate a first amplitude null at transmit port 112 of coupler 101 (FIG. 1) while supplying the first predetermined tone to receive port 111 of coupler 101. Upon detection of the desired amplitude null control is transferred to operational block 712.

Operational block 712 causes control signals to be supplied to signal source 107 for disabling the first predetermined tone signal, in this example 1300 Hz, and for enabling a second predetermined tone, in this example 325 Hz.

Operational block 713 which is identical to operational block 710, except that the delay is equal to two (2) positive transitions of TCLK or approximately 6 milliseconds, initializes the control function.

Figure 10:
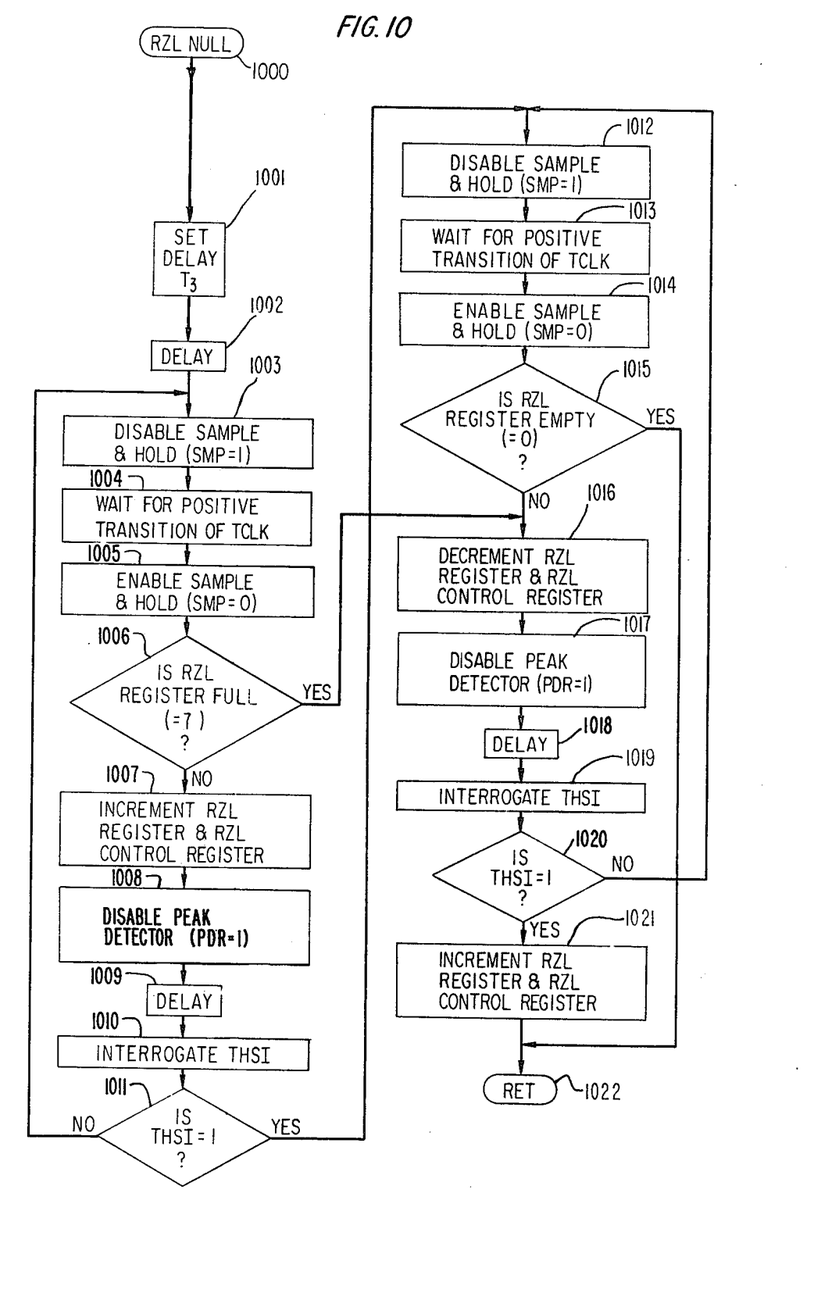
FIG. 10 is a flow chart of RZL amplitude null search subroutine employed in the flow chart of FIGS. 7 and 8.

Operational block 714 causes adjustable impedance RZL null subroutine to be called. A flow chart of the RZL null subroutine is shown in FIG. 10 and is described below. RZL null subroutine controls generation of signals to effect a second impedance adjustment in the prescribed sequence, in accordance with an aspect of the invention, to generate a second amplitude null at transmit port 112 (FIG. 1) while supplying the second predetermined tone to receive port 111. Upon detection of the second amplitude null control is transferred to operational block 715.

Operational block 715 causes control signals to be supplied to signal source 107 for disabling the second predetermined tone, i.e., 325 Hz and for enabling a predetermined signal to be generated, in accordance with an aspect of the invention, including a plurality of predetermined frequency components having a predetermined frequency spacing in a given frequency band. In an example from experimental practice, a pseudo-random noise signal is employed having frequency components spaced at 100 Hz in a band from 700 Hz to 3400 Hz.

Operational block 716 causes a control signal to be supplied to detector, sample and hold 109 for enabling an averaging circuit by supplying an AVG=1 signal to switch 418 connecting capacitor 417 to ground.

Operational block 717 which is identical to operational block 710, except that the delay is equal to one (1) positive transition of TCLK or approximately 10 milliseconds, causes the control to be initialized.

Operational block 718 causes adjustable impedance RKL null subroutine to be called again. Once the RKL null subroutine is completed control is transferred to operational block 719.

Operational block 719 causes control signals to be supplied to signal source 107 for disabling the pseudo-random noise signal.

Operational block 720 causes control signal BIP=0 to be supplied to switching elements 106 and 108 (FIG. 1) to disconnect signal source 107 and detector, sample and hold 109 and reconnect unidirectional facility 103 and 104 to receive port 111 and transmit port 112, respectively, of bidirectional-to-unidirectional coupler 101.

The loaded routine is exited via oval 721.

In the above-described sequence, the adjustment of impedance RKL first while supplying the individual tone signal causes a rapid convergence to the desired optimum impedance adjustment when supplying the pseudo-random noise signal and again adjusting impedance RKL. It should be noted, however, that impedance RKL may be adjusted only by employing the pseudo-random noise signal. Similarly, impedance RKL may be adjusted first while supplying the pseudo-random noise signal and subsequently while supplying the individual tone signal.

It is also important to note that the use of the periodic characteristic of the pseudo-random noise signal insures that when detecting the average amplitude value at transmit port 112 and adjusting impedance RKL that a null is being approached and that a variation in the noise signal, as would occur if a random noise signal was used, was not detected as a null indication. Otherwise, an optimum impedance adjustment would not be rapidly obtainable.

FIG. 9 shows a flow chart of adjustable impedance RKL amplitude null search subroutine employed in the loaded facility routine shown in FIGS. 7 and 8. Accordingly, the RKL null subroutine is entered via an oval 900.

Conditional branch point 901 tests to determine if the tone signal is 1300 Hz. If the test result is yes, control is transferred to operational block 903 and first delay interval T1 is set. In an example from experimental practice, delay T1 is approximately 740 microseconds. Thereafter, control is transferred to operational block 904. If the test result is no, the pseudo-random noise signal is present and control is transferred to operational block 902 to set delay interval T2. In an example from experimental practice delay T2 is approximately 9.5 milliseconds. Operational block 904 causes delay interval T1 or T2 to be effected.

Operational block 905 causes sample and hold circuit 408 (FIG. 4) to be disabled by supplying a logical "1" signal SMP (SMP=1) to switch 413, causing that switch to short circuit.

Operational block 906 causes a wait interval until the next positive transition of signal TCLK from signal source 107 occurs.

Operational block 907 enables sample and hold circuit 408 (FIG. 4) by supplying a logical "0" signal SMP (SMP=0) to switch 413, thereby causing the peak value of the output from peak detector 405 to be stored across hold capacitor 411.

Conditional branch point 908 tests to determine whether adjustable impedance RKL register is full, i.e., in this example storing a number equal to 31. This guards against the possibility of overflowing the RKL register in CPU 602 (FIG. 6). If the test result is yes and the RKL register is full, control is transferred to operational block 918. However, since this is the first run, it is unlikely that the RKL register is full and the test result is no. Consequently, control is transferred to operational block 909.

Operational block 909 causes the RKL register and RKL control register 609 (FIG. 6) to be incremented.

Operational block 910 causes peak detector 405 to be disabled via switch 407 (FIG. 4) being closed by a PDR=1 for a prescribed interval, in this example approximately 100 microseconds.

Operational block 911 causes the delay interval for disabling the peak detector to be effected.

Operational block 912 causes signal THSI (FIG. 4) to be interrogated.

Conditional branch point 913 tests to determine if THSI is a logical 1. That is to say, whether the present output from peak detector 405 (FIG. 4) is greater than the last previously sampled value of the output from peak detector 405 stored on capacitor 411. If the test result is no, i.e., THSI=0, control is again transferred to operational block 905 and the above process is iterated until an increase in the output from peak detector 405, i.e., an amplitude increase of the signal at transmit port 112, has been detected, thereby yielding a yes test result. Upon obtaining a yes test result, control is transferred to operational block 914.

Operational block 914 causes sample and hold circuit 408 (FIG. 4) to be disabled via switch 413 being short circuited by supplying SMP=1.

Operational block 915 causes a wait interval until the next positive transition of signal TCLK from source 107 (FIG. 1).

Operational block 916 causes sample and hold circuit 408 (FIG. 4) to be enabled via switch 413 being opened by SMP=0.

Conditional branch point 917 tests whether the RKL register is empty, i.e., RKL register=0. This is to guard against underflow of the RKL register. If a yes test result is obtained, control is transferred to oval 924. If a no test result is obtained, control is again transferred to operational block 918.

Operational block 918 causes the RKL register in CPU 602 and RKL control register 609 to be decremented.

Operational block 919 causes the peak detector 405 to be again disabled for a prescribed interval.

Operational block 920 causes the disable interval to be effected.

Operational block 921 causes signal THSI to be interrogated.

Conditional branch point 922 tests to determine whether THSI=1, i.e., that THSI indicates an increase in the sampled amplitude at transmit port 112. If the test result is no, control is again transferred to operational block 914 and the above process is iterated until conditional branch point 922 yields a yes test result. Upon detection of a yes test result, control is transferred to operational block 923.

Operational block 923 causes the RKL register in CPU 602 and RKL control register 609 to be incremented.

Thereafter, control is returned to the main program via oval 924.

FIG. 10 shows a flow chart of adjustable impedance RZL amplitude null search subroutine employed in the loaded facility routine shown in FIGS. 7 and 8. The RZL null subroutine illustrated by elements 1000 through 1022 is essentially identical to the RKL null subroutine shown in FIG. 9, the only difference being that the RZL values are supplied to a RZL register in CPU 602 and RZL control register 607. Additionally, no test is made to determine which signal is present and delay T3 is different. In an example from experimental practice delay T2 is approximately 3 milliseconds. Also the RZL register is full at a count of 7.

I claim:

1. A transmission network (FIG. 1, 101) having receive (111) and transmit (112) ports and at least a third port adapted to couple a bidirectional (2-wire) transmission facility (102) to receive (103) and transmit (104) unidirectional facilities (4-wire) including a controllably adjustable impedance network (FIG. 2, 202) in circuit with said receive (111), transmit (112) and third ports and responsive to control signals having a plurality of adjustable impedance elements (FIG. 4, RKL, RZL) for obtaining an optimum match to the impedance of the bidirectional facility (102), CHARACTERIZED BY, a controllable source (107) of at least an individual tone signal having a predetermined frequency (for example 325 Hz), and of a test signal having a plurality of predetermined frequency components (for example components at 100 Hz spacing between 700 Hz and 3400 Hz), means (109) for detecting signal amplitude values at the transmit port (112) of the transmission network, and means (105) for generating control signals to control supplying said test signal to the receive port (111) and to adjust a predetermined one of the impedance elements (for example RKL) for obtaining an average value amplitude null (detected via 109) at the transmit port (112), and to control supplying said individual tone signal (for example 325 Hz from 107) to the receiving port (111) and to control adjusting a predetermined one of the impedance elements (for example RZL) for obtaining an amplitude null (detected via 109) at the transmit port (112), so that transhybrid loss between the receive port (111) and transmit port (112) is maximized.

2. The invention as defined in claim 1 wherein said test signal repeats at a periodic rate.

3. The invention as defined in claim 1 wherein said test signal has a plurality of equally spaced frequency components (for example, 100 Hz) in a predetermined frequency band (for example, 700 Hz to 3400 Hz).

4. The invention as defined in claim 1 wherein said test signal is a pseudo-random noise signal in which the plurality of predetermined frequency components repeates at a periodic rate.

5. The invention as defined in claim 1 wherein said amplitude detector means (109) includes controllable means (416 and 417) for detecting the average amplitude value of said test signal, means (418 via AVG) for controllably enabling and disabling said average detecting means a peak detector (405), means for sampling (413) and holding (411) an amplitude value representation of an output from said peak detector (405), and means (409, 410, 414) for comparing the sampled and held amplitude value (on 411) with a present amplitude output from said peak detector (405) to generate an output signal (THSI) representative of whether the present output from said peak detector (405) is larger or smaller than the sampled and held amplitude value (on 411).

6. The invention as defined in claim 1 wherein said controllable source (107) generates at least a plurality of individual tone signals each having a predetermined frequency (for example, 1300 Hz and 325 Hz), and wherein said control signal generating means generates control signals to control supplying the individual tone signals (from 107) to receive port (111) of the transmission network (101) and to control adjusting in a prescribed sequence (FIGS. 7 and 8) the individual impedance elements (RKL and RZL) while a predetermined tone signal is supplied to the receive port in said sequence for obtaining an amplitude null (detected via 109) at the transmit port (112) for each impedance element in said sequence, (FIGS. 7 and 8) and then to supply said test signal to the receive port (111) and to again adjust a predetermined one of said impedance elements for obtaining an amplitude null (detected via 109) at the transmit port (112), so that transhybrid loss between the receive port (111) and transmit port (112) is maximized.

7. The invention as defined in claim 6 wherein the prescribed adjustment sequence (FIGS. 7 and 8) includes first adjusting a first predetermined one of the adjustable impedance elements (RKL) while supplying a first tone signal (for example, 1300 HZ) to the receive port (111) until an amplitude null is detected (via 109 and FIG. 9) at the transmit port (112), second adjusting a second predetermined one of the adjustable impedance elements (RZL) while supplying a second tone signal (for example, 325 Hz) to the receive port (112) until an amplitude null is detected (via 109 and FIG. 10) at the transmit port (112), and third again adjusting said first impedance element (RKL) while supplying said test signal to the receive port (111) until an average value amplitude null is detected (via 109 and FIG. 9) at the transmit port (112).

8. The invention as defined in claim 7 wherein said test signal includes a plurality of equally spaced frequency components (for example, 100 Hz) in a predetermined frequency band (for example 700 Hz to 3400 Hz) which reoccur periodically.

9. The invention as defined in claim 6 wherein said control signal generating means (105), includes central processor means (FIG. 6, 602), clock means (601) for supplying a first timing signal to said central processor means (602), read-write memory means (603), read only memory means (604), input/output means (I/O 605), bus means (606) and a plurality of control registers (607 and 609).

10. The invention as defined in claim 9 wherein a set of instructions are stored in said read-only memory (ROM) for controlling said control signal generating means (105) to effect adjustment of the adjustable impedance elements (RKL and RZL) in a prescribed sequence (FIGS. 7 and 8) by supplying a first tone signal (for example, 1300 Hz from 107) to the receive port (111), adjusting (via 609) a first one of said adjustable impedance elements (RKL) until an amplitude null is detected at the transmit port (112 via 109 and FIG. 9, 900-924), supplying a second tone signal (for example, 325 Hz from 107) to the receive port (111), adjusting (via 607) a second one of said adjustable impedance elements (RZL) until an amplitude null is detected at the transmit port (112 via 109 and FIG. 10, 1000-1022) and by supplying said test signal to the receive port (111), again adjusting said first one of said adjustable impedance elements (RKL) until an average value amplitude null is detected at the transmit port (112 via 109 and FIG. 10, 900-924).

11. The invention as defined in claim 9 wherein said test signal is a pseudo-random noise signal having a plurality of equally spaced frequency components (for example, 100 Hz) in a predetermined frequency band (for example, 700 Hz to 3400 Hz) which repeat at a periodic rate.

* * * * *